INVENTORS
GILBERT V. KULLGRIN,
DANIEL W. STEPHENSON,
WINCHEL J. GOODWIN,
HAROLD G. BAILEY &
BY ROBERT J. SCHROYER

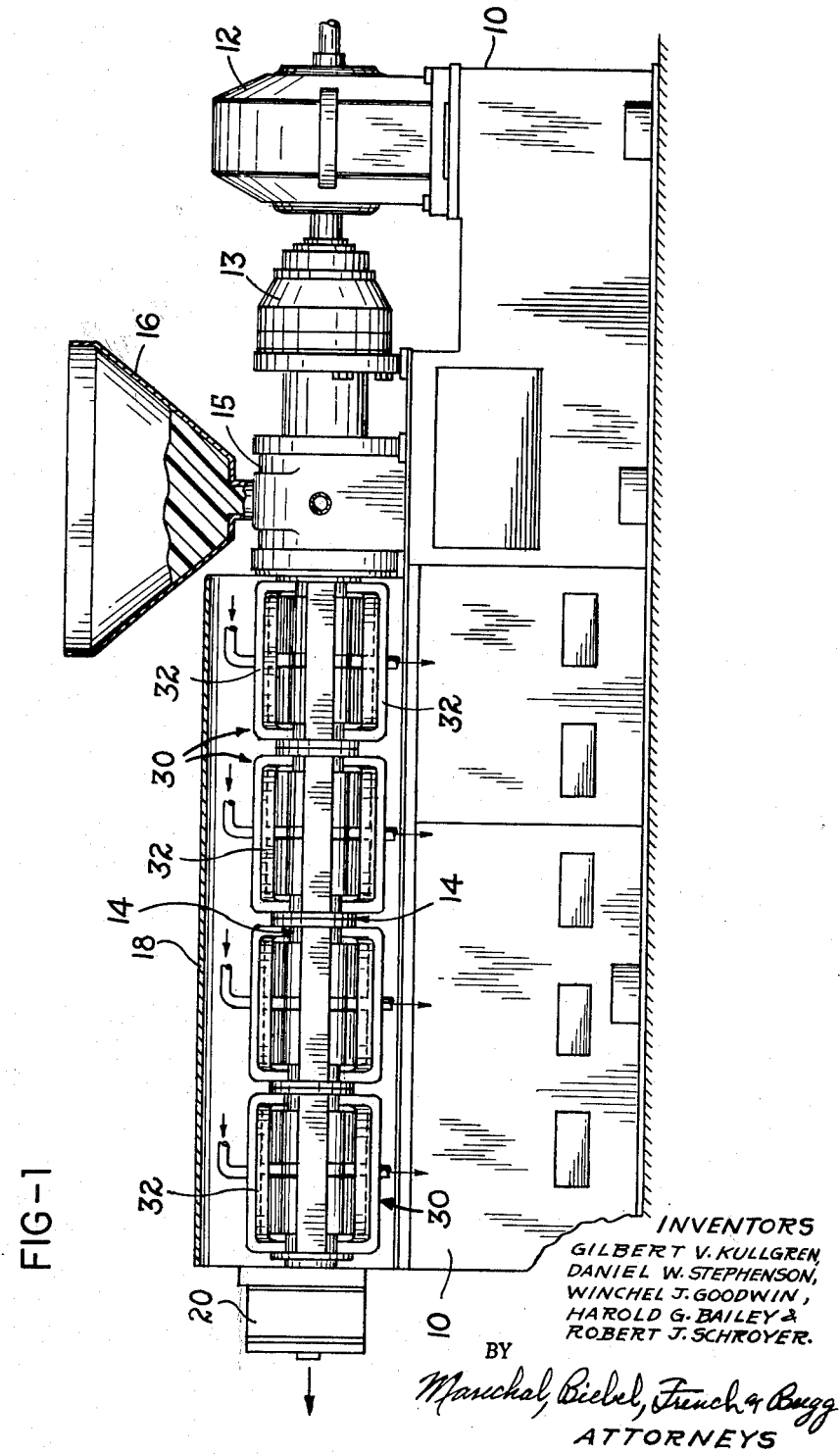

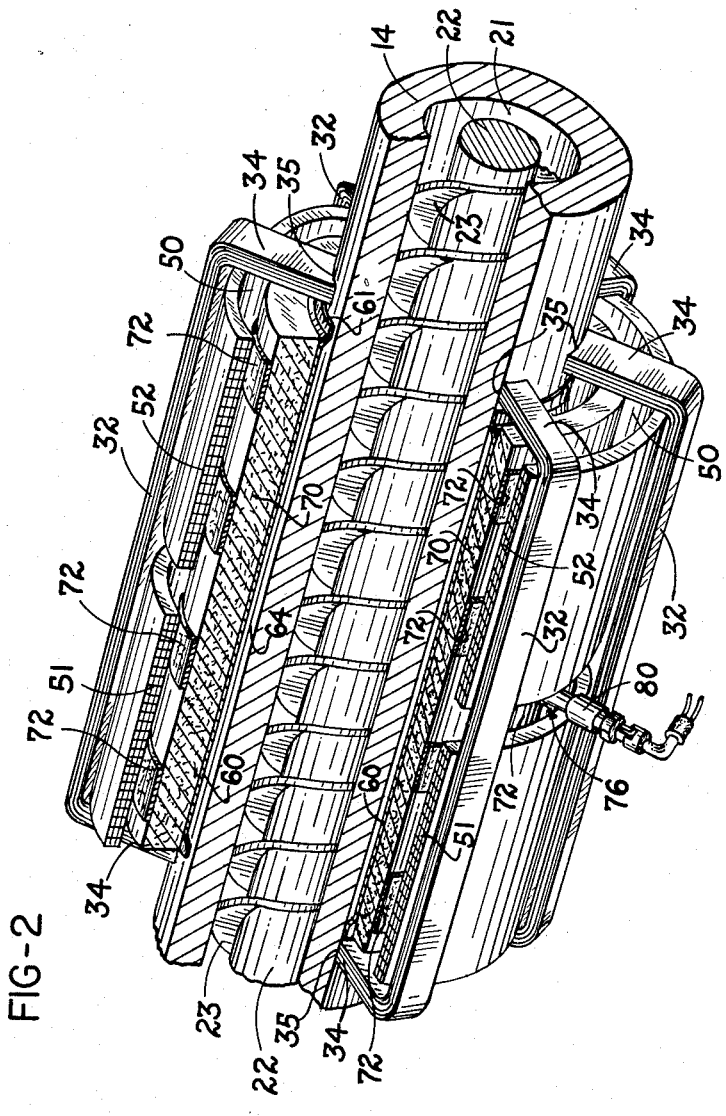

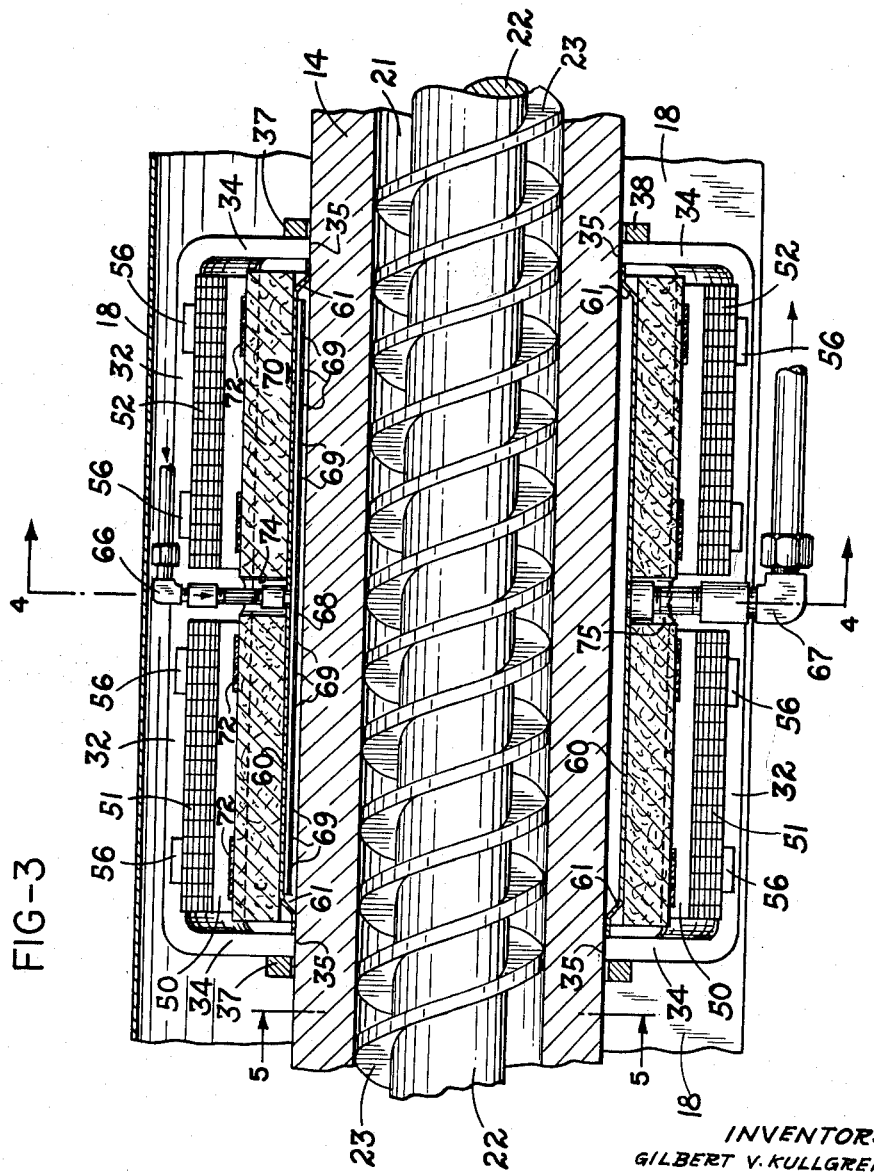

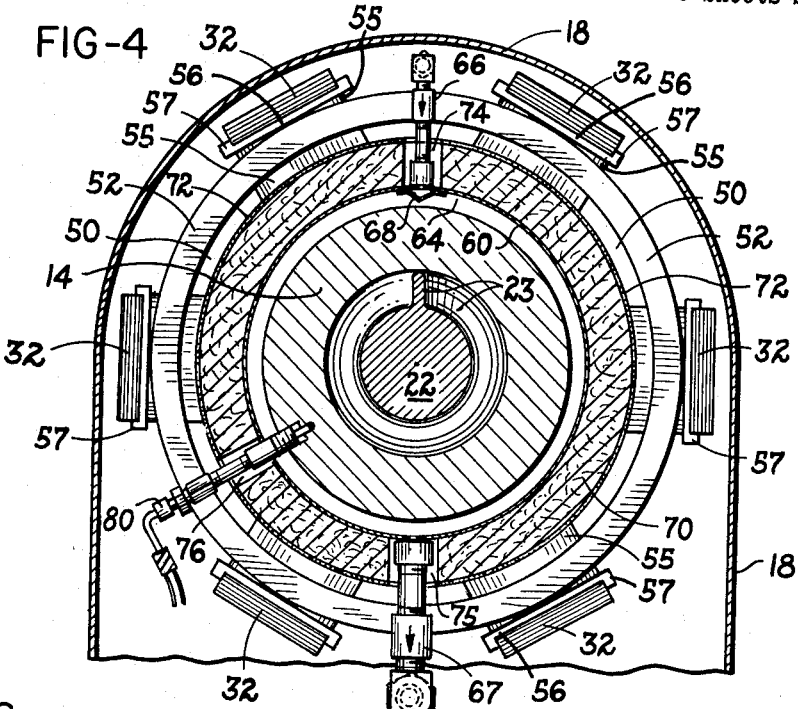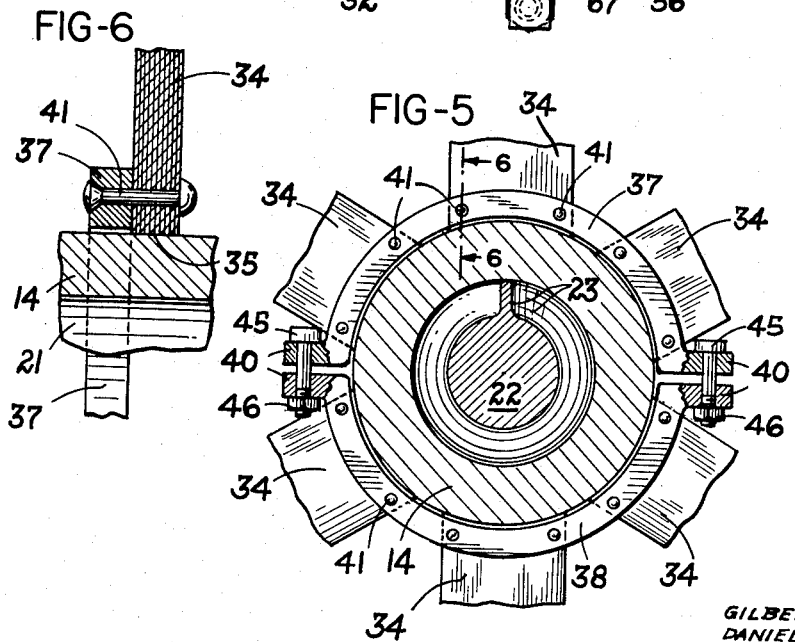

ATTORNEYS

United States Patent Office 3,129,459
Patented Apr. 21, 1964

3,129,459
INDUCTION HEATED EXTRUDER
Gilbert V. Kullgren, Daniel W. Stephenson, Winchel J. Goodwin, and Harold G. Bailey, Akron, and Robert J. Schroyer, Cuyahoga Falls, Ohio, assignors, by mesne assignments, to Blaw-Knox Company, Pittsburgh, Pa., a corporation of Delaware
Filed May 16, 1961, Ser. No. 110,502
6 Claims. (Cl. 18—12)

This invention relates to plastic extruders and more particularly to extruders having induction heating. This application is a continuation-in-part of our copending application Serial No. 827,862, filed July 17, 1959, now abandoned.

Extruders of this general type preferably operate over a wide range of temperatures in order to accommodate a wide variety of plastic materials for extrusion. Accordingly, such extruders preferably include an efficient heating arrangement for bringing the plastic material up to a desired extruding or "melt" temperature and for holding such material at the desired temperature with a minimum of lost energy. Modern resins are extruded in a wide range of operating temperatures with an upper limit in the neighborhood of 800° F., and higher. Also, such resins are, themselves, poor heat conductors. Accordingly, there exists a requirement for extruder heating apparatus which concentrates the available heat within the plastic material or within its container and which maintains the desired temperature with a high degree of regulation.

Since the extrusion process involves the working of the plastic, the heating arrangement preferably includes provision for the cooling of the extruder body through which the material passes, such as the barrel, to prevent overheating of the plastic material due to its friction and to the work being put into it. Such cooling arrangements must be efficient so that the desired operating temperatures can be maintained with a minimum of override and with a maximum delivery rate.

Electric coils employed in induction heating units are preferably formed with high temperature epoxy resins but such resins are known to break down at sustained temperatures considerably lower than the desired maximum extruding temperatures of certain high temperature resins. It is therefore necessary to protect and isolate such electric coils from the effects of its own induction heating so as to provide a high temperature capability and a heating unit with a long and trouble-free service life.

The above objects and requirements are met in the instant invention wherein the natural cavity formed by the flux guides is utilized to the maximum extent. The heating units of this invention include an electric coil, preferably but not necessarily formed in two sections, with a separating space therebetween. The coil is preferably positioned closely adjacent the inside surface of the flux guides, but is preferably held by suitable clips from making direct contact therewith. The electric coil is proportioned together with the flux guides to define an open space between the inside surface of the electric coil and the adjacent surface of the body such as the extruder barrel, die, nozzle or other container which is being heated.

Cooling is provided by a stainless steel jacket formed in surrounding relation to the outside surface of the barrel and includes therein a quenching liquid distributing arrangement whereby the cooling liquid, usually water, may be directed to the surface of the extruder barrel and flashed into steam for the purpose of absorbing heat therefrom, as required. Such a stainless steel jacket is preferably formed of relatively thin material which is joined to the barrel by mean of a flexible joint so that expansion and contraction movements may be absorbed without breaking the connection therebetween. It is also preferable to provide a pad of insulating material which is positioned within the free air space against the outside surface of the cooling jacket but which has a smaller dimension than the total distance of the space between the coil and the jacket.

It has been found that the above arrangement provides an extruder wherein the coil is adequately isolated from the effects of heating so that high temperatures may be maintained in the barrel or container while effectively insulating the electric coil without the necessity of using forced air or other external cooling for this purpose. The cooling by a liquid within the jacket and the flux heating by the electric coil are preferably mutually exclusive of each other in the sense that both are not operated at the same time. However, each contributes to the effectiveness of this invention in maintaining a desired working temperature.

It is therefore an object of this invention to provide an induction heater, as outlined above, which is effective to maintain close regulation of the temperature of plastic material within an extruder.

A further object of this invention is to provide an induction heating arrangement for a plastic extruder, as outlined above, characterized by a capability of operating over a wide range of temperatures with high extruding rates.

Another object of this invention is to provide a plastic extruder having an induction heating unit wherein the electric heating coil is effectively isolated from the body being heated so as to provide a heating capability well above the temperature at which the coil would be destroyed.

A still further object of this invention is to provide an eddy current heater for a plastic extruder including an effective arrangement for the application of water uniformly over an extruder body for the flashing of such water into steam, including an arrangement for removing the condensate.

A still further object of this invention is the provision of a heater for a plastic extruder including a pair of longitudinally spaced apart heating coils with provision for the placement of thermocouples and other connections therebetween.

Another object of this invention is the provision of an induction heater employing flux guides and utilizing the cavity formed thereby for the insulation of the electric coil from the body being heated.

These and other objects and advantages of the invention will be apparent from the following description, the accompanying drawings and the appended claims.

In the drawings:

FIG. 1 is a side elevation, partly in section, of an extruder constructed according to this invention;

FIG. 2 is a perspective view of a portion of the extruder barrel and one of the induction heating units showing the parts broken away to expose the internal details thereof, with certain parts being omitted in the interests of clarity;

FIG. 3 is a vertical section through the heating unit of FIG. 2;

FIG. 4 is a transverse section taken generally along the line 4—4 of FIG. 3;

Figure 7:
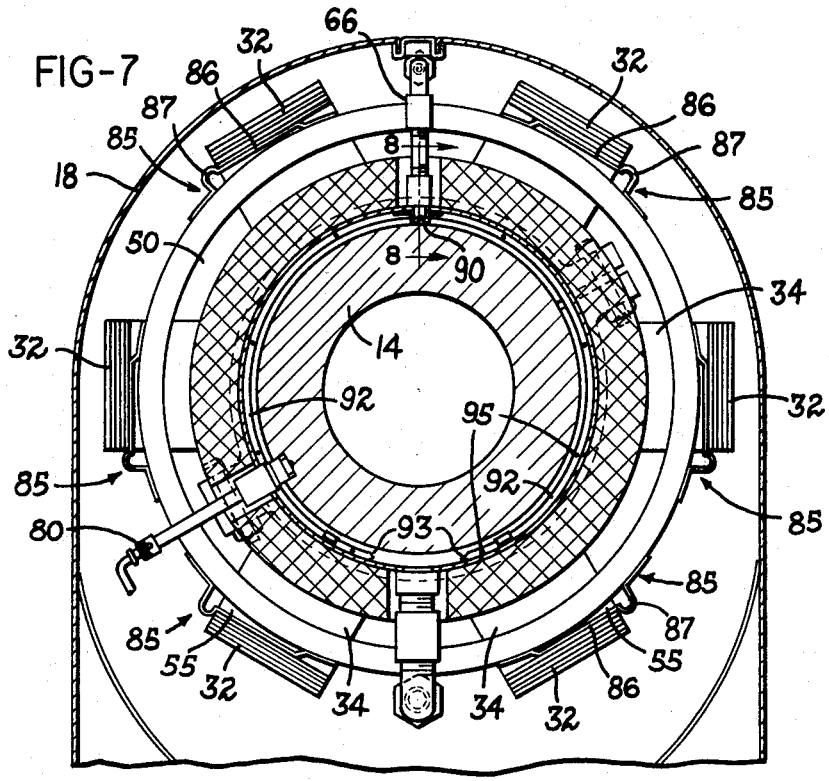
Figure 8:
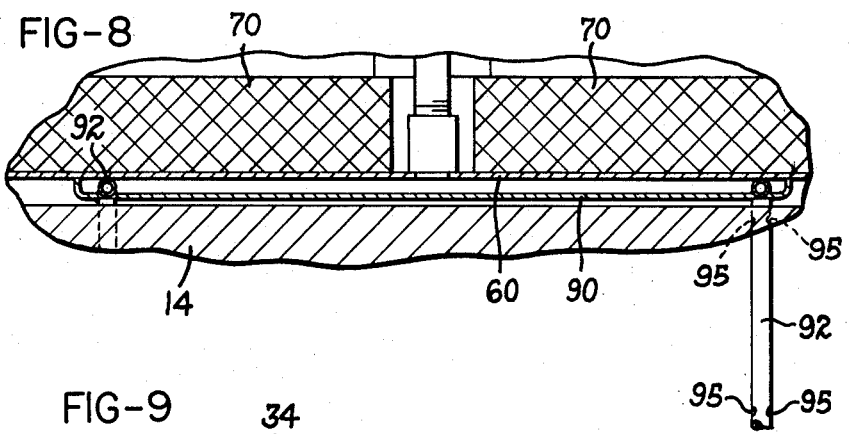
Figure 9:
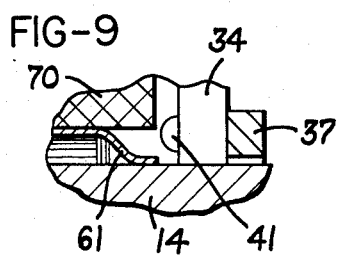

FIGS. 5 and 6 are fragmentary sections, the former taken generally along the line 5—5 of FIG. 3 and the latter taken generally along the line 6—6 of FIG. 5, both of the figures showing the parts as they appear after having been rotated through an arc of 30°;

FIG. 7 is a sectional view similar to FIG. 4 showing a slightly modified form of the invention;

FIG. 8 is a fragmentary longitudinal section showing the arrangement of the water distributing tube and the quenching rings taken generally along the line 8—8 of FIG. 7; and FIG. 9 is an enlarged fragmentary detail showing one of the retaining lips of the water jacket.

Referring to the drawings, which illustrate preferred embodiments of this invention, a screw extruder is shown in FIG. 1 as including a mounting piece 10 upon which is mounted a gear reduction unit 12. The unit 12 is driven from a heavy-duty motor (not shown) and, in turn, drives a thrust assembly 13 which may be constructed according to Kullgren and Stephenson Patent No. 2,938,231, issued May 31, 1960. The thrust assembly 13 forms one end of the etxruder which has an extending body or barrel indicated generally at 14 and also includes the usual supporting member 15 and hopper 16 through which the plastic material being processed is supplied to the extruder barrel 14.

A removable shroud 18 encloses substantially the entire length of the barrel 14 and serves as a heat barrier to provide comfort for operators from the heat generated within the extruding barrel. A suitable nozzle is somewhat diagrammatically shown at 20 on the end of the barrel 14, and it is understood that the nozzle 20 may be of any suitable form for the type of extrusion desired without departing from the scope of this invention.

The barrel 14 includes a cylindrical cavity 21 through which the plastic material is moved at an elevated temperature controlled by the apparatus of this invention. Disposed axially within the cavity 21 is a rotatably mounted shaft 22 having an inner end extending into the assembly 13 for rotation by the gear reduction unit 12, and an outer end terminating adjacent the nozzle 20. One or more suitable helical conveyor flights 23 are formed on the shaft 22 for the delivery of the plastic material to the nozzle 20 at an elevated pressure.

Means for controlling the temperature of the plastic material within the barrel 14 includes a plurality of induction heating units 30 arranged generally axially along the longitudinal length of the barrel 14, although it is understood that this invention may be applied to the control of temperature within non-cylindrical bodies, such as for the heating of flat film dies and the like. Each of the units 30 is preferably identical in construction to the other and one of the units is shown in enlarged detail in FIGS. 2 and 3 as including a plurality of generally U-shaped flux guides 32. The guides 32 are preferably formed of highly grain-oriented laminated silicone steel and each have longitudinally extending bodies with opposite radially inwardly turned legs 34. The terminal ends 35 of the legs 34 are preferably accurately machined so as to form an intimate contact with the adjacent surface of the body to be heated, that is the barrel 14 in the specific example given. Preferably, the barrel 14 is also machined where it is to accommodate the leg ends 35.

Any convenient number of the flux guides 32 may be used, and a satisfactory arrangement for cylindrical barrels is the employment of six guides 32 positioned approximately 60° from each other. Means for holding the machined ends 35 of the guides 32 in intimate contact with the adjacent surface of the barrel includes a pair of fastening means, one provided at each of the sets of legs. One of such fastening means is shown in FIGS. 5 and 6 as including a pair of substantially identical semi-circular coupling rings 37 and 38 which are suitably proportioned, such as by machining, so as to provide adequate clearance about the barrel 14. The rings may be formed of 0.20 carbon steel and include outwardly extending flanges 40 at the ends thereof which are provided with bolt receiving openings.

The rings 37 and 38 are connected to the legs 34 of the flux guides by means of rivets 41 as shown in FIG. 6. The rivets 41 also assist in preventing delamination of the flux guides under the high temperatures prevailing within the barrel 14.

Draw bolts 45 are extended through the holes in the flanges. By the tightening of the nuts 46 the rings may be urged toward, but not into physical engagement with, the barrel 14. This brings the legs of the flux guides 32 down into intimate contact with the barrel and provides an essentially rigid supporting structure at each of the units 30.

It may be seen by reference to FIGS. 2 and 3 that the bodies of the guides 32 define a cavity 50 between the inner surfaces thereof and the surface of the body or barrel to be heated. This cavity is utilized by this invention to contain the electrical and thermal components and to isolate and insulate the electric coil from excessively high temperatures.

The flux inducing, current carrying coils are shown as being divided into a pair of axially spaced individual coils 51 and 52 which may be conveniently connected in series or in parallel depending upon whether 440 or 220 v. A.C. is employed. Preferably, the coils are designed to operate at standard and relatively low frequencies, such as 60 cps.

The electric coils 51 and 52 are formed with layers of wire of square cross section which are consolidated by the application of high temperature silicone varnish or other suitable high temperature electrical binding compound. The coils are then covered and protected with glass tape and high temperature epoxy resin. It is understood that the size of the wire, the number of turns in each layer, and the number of layers will depend upon the installation in which the coils are used.

The outer dimensions of the coils 51 and 52 are proportioned so as to lie within the cavity 50 formed by the guides with the outer surface thereof closely adjacent the inner surface of the guide bodies. It is desirable to support the electric coils on the guides 32 as close as practicable thereto but to avoid direct contact with the guides. Therefore, the invention includes means for supporting the coils 51 and 52 on the flux guides 32 and for providing a clearance space 55 (FIG. 4) therebetween. Such means includes a plurality of spacers or clips 56 formed preferably of non-magnetic material such as stainless steel or reinforced phenol-formaldehyde resin known as grade C "Formica." Resin clips 56 are shown in FIG. 4 as being channel-shaped with upstanding end flanges 57 which straddle the long sides of the flux guides 32 when the coupling rings 37 and 38 are urged toward the barrel 14 by the bolts 40. The clips 56 therefore define a clearance space 55 between the outside surface of the coils 51 and 52 and the inside surface of the guides 32 which prevent direct heat flow from the guides to the coils since the guides may operate at relatively high temperatures due to internal losses and conduction heating from the barrel 14.

Means for cooling the barrel 14 upon the occurrence of a temperature therein in excess of a desired operating temperature includes a thin non-magnetic metal jacket 60, preferably made of stainless steel. The jacket 60 is formed of thin material consistent with the objective of not robbing the barrel 14 of heat. It is formed in closely surrounding relation to the surface of the barrel, and the radial dimension or extent of the jacket 60 is small as compared to the total radial extent of the cavity 50 formed beneath the guides 32. Also, the jacket 60 is proportioned to lie wholly within the longitudinal extent of the barrel defined by the legs 34 of the flux guides.

The jacket 60 is formed with opposite annular lips 61 which are suitably secured to form a seal with the surface of the barrel, as by welding or brazing. The jacket 60 therefore forms a quench chamber 64 with the barrel 14. The inwardly turned ends of the jacket forming the lips 61 provide for the absorption of strain due to the differences in the expansion and contraction rates of the jacket 60 as compared to the barrel 14, such as may be due to the difference in heating rates and the differences in the coefficients of expansion. Preferably, the lips 61 are formed with smoothly rounded contours rather than with sharp breaks or angles, as shown in enlarged detail in FIG. 9, to prevent the concentration of stress therein due to the differences in expansion or contraction.

As is best shown in FIGS. 3 and 4, the unit 30 includes water inlet and outlet conduits 66 and 67 each opening into the quench chamber 64 at the jacket 60 and extending radially therefrom through the space between the coils 51 and 52. The conduits 66 and 67 may be made up of pipe sections and fittings coupled together and form a fluid tight seal with the jacket 60.

The unit 30 includes suitable means within the chamber 64 for distributing the quenching liquid, preferably water, over the enclosed surface of the barrel 14. One form of such means is a longitudinally extending, V-shaped metal trough 68 mounted on the inside of the jacket below the inlet conduit 66 and preferably secured by a metallic bond thereto. Perforations 69 are formed along the length of the conduit 68 through which the quenching liquid is distributed.

The unit 30 preferably includes insulating means positioned in the remaining space between the barrel 14 and the electric coils and preferably positioned closely adjacent to the barrel. The insulating means preferably takes the form of an annular pad 70 of conventional thermal insulating material secured in surrounding relation against the outer surface of the jacket 60 by glass tape 72. The outer surface of the pad and the inner surfaces of the coils 51 and 52 define an open air space therebetween which serves further to insulate the electric coils against excessive heat from the barrel 14. This space comprises the remaining portion of the radial extent of the cavity 50 and may have a radial dimension of between 0.25 and 0.5 inch as an example. This open and free air space, together with the pad 70 of insulating material, have been found effective to insulate the coils against damaging temperatures. Accordingly, temperatures in excess of 800° F. may be generated within the barrel 14 without exceeding the maximum temperature sustainable by the electric coils in normal operation.

The pad 70 is formed with suitable access openings 74 and 75 for the inlet and outlet conduits 66 and 67. A similar access opening 76 may be provided for a thermocouple assembly 80 which extends through the jacket 60 by means of an adaptor plug 81 and into the barrel 14.

In operation, the thermocouple assembly 80 preferably controls suitable on-off electrical and hydraulic controls which are adjustable to predetermined operating or melt temperatures according to the plastic material being extruded. The combined temperature regulating action of the several units 30 combine to maintain a desired temperature within the barrel 14 and prevent an excess temperature which would damage or decompose the plastic material with the likelihood of the clogging of the extruder.

Preferably, low frequency electric current is supplied to the coils 51 and 52 which may be connected either in series or in parallel, as desired. The lower the frequency, the greater is the penetration of heat within the barrel. 60 cycle A.C. has been found satisfactory and provides ¾ to 1 inch heat penetration by the $I^2R$ heating of the eddy currents therein. There may also be heating due to hysteresis losses. The flux guides 32 preform the well-known effect of providing a low loss return path for the magnetic flux and are subject to a minimum of internal heating due to the laminations.

The quench chamber 64 is preferably operated independently of the heating coils and not concurrently therewith. Water may be applied to the chamber 64 through the inlet conduit 66 and the trough 68 to prevent the override of temperatures within the barrel and to remove heat from the barrel when working stiff plastics. The water is flashed into steam upon striking the outer surface of the barrel through the openings 69 thus taking advantage of the heat of conversion so that a small quantity of water removes a large quantity of heat. The outlet conduit 67 provides a means of removing steam and condensate from the chamber 64. Thus, the arrangement of this invention permits rapid heat removal and therefore provides an extruder capable of continuous high capacity operation with stiff plastics and plastics which have critical melt temperatures.

The clearance spaces 55 between the outer dimension of the coils and the inside surfaces of the flux guides prevent the burning of the coils when operating the barrel at elevated temperatures. The free air space portion of the cavity 50 and with the pad 70 effectively insulate the electric coils from the high temperatures within the barrel and permit continuous high temperature operation in excess of the maximum temperature which can be tolerated within the coils.

A slightly modified form of the invention is shown in FIGS. 7 and 8 wherein corresponding parts are given corresponding numbers as described in connection with FIGS. 1–6. In FIG. 7, stainless steel spacer clips 85 are employed in lieu of the phenolic clips 56 and are formed as an integral part of the binder material for the electric coils on the outer periphery thereof. The clips 85 include a raised body portion 86 and a positioning rib 87 which engage the bottom and side surfaces of each of the flux guides 32 for accurately positioning the coil upon the tightening of the rings 37 and 38 and maintain the clearance spaces 55.

FIGS. 7 and 8 show a modified form of the quenching liquid distributing means within the jacket 60. In place of the V-shaped trough 68, a generally U-shaped tube or trough 90 is secured across the top of the jacket beneath the inlet conduit 66. One or more, preferably a pair, of arcuately formed liquid distributing rings 92 have upper ends opening into the trough and extend downwardly in generally circumferential relation to the surface of the barrel and terminate in adjacent closed ends 93. Pairs of openings 95 are formed within the rings for distributing diverging streams of quenching liquid evenly over the surface of the barrel 14 enclosed within the jacket 60.

It is therefore seen that this invention provides an induction heating and cooling arrangement which makes effective use of the cavity formed by the flux guides and which incorporates an effective heat removal unit using the heat of conversion of a liquid for cooling. Thus, a single extruder may be operated at high capacity over a wide range of operating temperatures. Elevated temperatures are possible due to the effective isolation and insulation of the electric coils and high extrusion rates with high pressures at lower temperatures are possible to the efficiency of the heat removing portions of this invention. Also, the invention may be applied to the heating of other portions of extruders, such as nozzles, and flat and circular film dies, and the like. Where cooling is not a problem, such as in an extrusion die, the quenching jacket may be omitted and in such cases, the pad 70 is placed closely adjacent the body being heated.

While the forms of apparatus herein described constitute preferred embodiments of the invention, it is to be understood that this invention is not limited to these precise forms of apparatus, and that changes may be made therein without departing from the scope of the invention which is defined in the appended claims.

What is claimed is:

1. An eddy current heater for a plastic extruder comprising an extruder body through which plastic material is moved at an elevated temperature, flux guides having extended bodies and inwardly turned ends in intimate contact with said extruder body for directing the flow of magnetic flux therethrough, said flux guides defining a cavity between the inner surface of said guide bodies and the adjacent surface of said extruder body, an alternating current induction heating coil in said cavity, non-magnetic coil-retaining clips secured to said coil and said guide bodies and holding the outer surface of said coil adjacent said flux guide bodies and defining a clearance space therebetween holding the outer surface of said coil free of direct magnetic contact with said guides and leaving the inside surface of said coil unsupported and free of heat conductive connection to said barrel, and a pad of insulating material positioned adjacent said extruder body having a radial thickness less than the radial extent of said cavity and defining with said coil an open air space to insulate said coil from excessive heating by said extruder body, the spacing between said coil and flux guide bodies being small compared to the spacing between said coil and said insulating pad.

2. A plastic extruder comprising a barrel formed of metal susceptible to heating by eddy currents, a screw rotatably received in said barrel for delivery of plastic therethrough under pressure to an extruder nozzle, means for controlling the temperature of the plastic within said barrel including a plurality of laminated flux guides disposed about said barrel with inwardly turned legs having ends shaped to conform to the outer surface of said barrel, means securing said guide ends in intimate contact with the outer surface of said barrel including a pair of split rings, connecting means securing said legs to said rings and serving to prevent delamination of said guides due to the heat of said barrel, means clamping said rings together in encircling relation to said barrel, an alternating current inductive heating coil positioned about said barrel adjacent the inner surface of said guides, means supporting said coil at the outer periphery thereof adjacent the inside surface of said flux guides leaving the inner periphery thereof unsupported and free of heat conductive connection to said barrel and an annular pad of insulating material secured in surrounding relation adjacent the outer surface of said barrel and defining an open air space between the outer dimension of said material and the inside surface of said coil to insulate said coil against excessive heat from said barrel.

3. A plastic extruder comprising a cylindrical barrel formed of metal susceptible to heating by eddy currents, a screw rotatably received in said barrel for delivery of plastic therethrough under pressure to an extruder nozzle, means for controlling the temperature of the plastic within said barrel including a plurality of flux guides spaced angularly thereabout from each other with radially inwardly turned legs having ends shaped to conform to the outer surface of said barrel, means securing said guide ends in intimate contact with the outer surface of said barrel, an alternating current inductive heating coil positioned about said barrel having an outer surface adjacent the inner surface of said guides, non-magnetic means attached to the outer periphery of said coil and supporting said coil directly on said flux guides defining a clearance between the outer periphery of the coil and the flux guide leaving the outer periphery of said coil free of magnetic contact with said flux guides and leaving the inner periphery of said coil unsupported and free of heat conductive connection, a thin non-magnetic water tight jacket surrounding said barrel and formed with opposite annular lips sealed thereto defining a quench chamber adjacent the outer surface of said barrel, water inlet and outlet conduit means opening into said chamber at said jacket and extending therefrom, means in said chamber for distributing quenching water over the surface of said barrel from said inlet conduit means for removal of heat flashing into steam, and an annular pad of insulating material secured in surrounding relation directly against the outer surface of said jacket and of a thickness substantially less than the spacing between said jacket and said coil to define an open air space between the outer dimension of said material and the inside surface of said coil to insulate said coil against excessive heat from said barrel.

4. A plastic extruder comprising a cylindrical barrel formed of metal susceptible to heating by eddy currents, a screw rotatably received in said barrel for delivery of plastic therethrough under pressure to an extruder nozzle, means for controlling the temperature of the plastic within said barrel including a plurality of flux guides spaced angularly thereabout from each other with radially inwardly turned legs having ends shaped to conform to the outer surface of said barrel, means securing said guide ends in intimate contact with the outer surface of said barrel, a pair of alternating current inductive heating coils positioned about said barrel in axial spaced apart relation, means supporting said coils adjacent the inner surface of said guides and defining therebetween a clearance space including non-magnetic clips attached to said coils at the outer surface thereof and having positioning means for engaging said guides holding said coils free of direct magnetic contact with said guides and leaving the inner periphery of said coils unsupported and free of connection to said barrel, a thin non-magnetic water tight jacket surrounding said barrel and formed with opposite annular lips sealed thereto defining a quench chamber adjacent the outer surface of said barrel, water inlet and outlet conduit means opening into said chamber at said jacket and extending radially therefrom between said coils, means in said chamber for distributing quenching water over the surface of said barrel from said inlet conduit for removal of heat from said barrel by flashing into steam, and an annular pad of insulating material secured in surrounding relation directly against the outer surface of said jacket and of a thickness substantially less than the spacing between said jacket and said coil to define an open air space between the outer dimension of said material and the inside surface of said coils to insulate said coils against excessive heat from said barrel.

5. A heat control unit for a high temperature plastic extruder barrel comprising, an extruder barrel body through which plastic material is moved at an elevated temperature, flux guides having extended bodies and inwardly turned ends in intimate contact with said barrel body for directing the flow of magnetic flux therethrough, said flux guides defining a cavity between the inner surface of said guide bodies and the adjacent surface of said extruder body, an alternating current induction heating coil in said cavity adjacent said flux guide body, means supporting said coil at the outer periphery thereof adjacent the inside surface of said guide box leaving the inner periphery thereof unsupported and free of connection to said barrel, a thin stainless steel jacket on said body inwardly of said coil and defining an open air space therebetween for isolating said coil from heat induced in said barrel, said jacket having a central portion with a circumference greater than said barrel body and having inwardly turned opposite lips welded to said body inwardly of said guide legs forming an enclosed water quench chamber, said lips being flexible to form a stress absorbing connection with said barrel, means connected to said jacket for admitting water into said chamber, means in said chamber connected to said water admitting means for distributing said water over said body for cooling by flashing thereon, and means connected to said jacket for the removal of water condensate therefrom.

6. A plastic extruder comprising a cylindrical barrel formed of metal susceptible to heating by eddy currents, a screw rotatably received in said barrel for delivery of plastic therethrough under pressure to an extruder nozzle, means for controlling the temperature of the plastic within said barrel including a plurality of flux guides spaced angularly thereabout from each other with radially inwardly turned legs having ends shaped to conform to the outer surface of said barrel, split rings secured to said guide legs and having clamping portions for securing ends in intimate contact with the outer surface of said barrel, an alternating current inductive heating coil positioned about said barrel means supporting said coil with an outer surface adjacent the inner surface of said guides leaving the inner periphery of said coil unsupported and free of connection to said barrel, a thin stainless steel jacket surrounding said barrel and formed with opposite annular lips welded thereto defining a water quench chamber adjacent the outer surface of said barrel, water inlet and outlet conduit means opening into said chamber at said jacket and extending therefrom, means in said chamber connected to said inlet for distributing quenching water for flashing into steam over the surface of said barrel from said inlet conduit means, and means defining an open air space under said flux guides between said jacket and the inside surface of said coil to protect said coil against excessive heat from said barrel.

References Cited in the file of this patent

UNITED STATES PATENTS

| | | |
|---|---|---|
| 2,729,731 | Kleinpeter | Jan. 3, 1956 |
| 2,868,938 | Barfield et al. | Jan. 13, 1959 |
| 2,875,311 | Hackenrider | Feb. 24, 1959 |
| 2,893,055 | Wenzel | July 7, 1959 |
| 2,904,664 | Rothacker | Sept. 15, 1959 |